July 24, 1928.
J. G. FAY
1,677,961
GOVERNOR
Filed Dec. 9, 1925   2 Sheets-Sheet 1
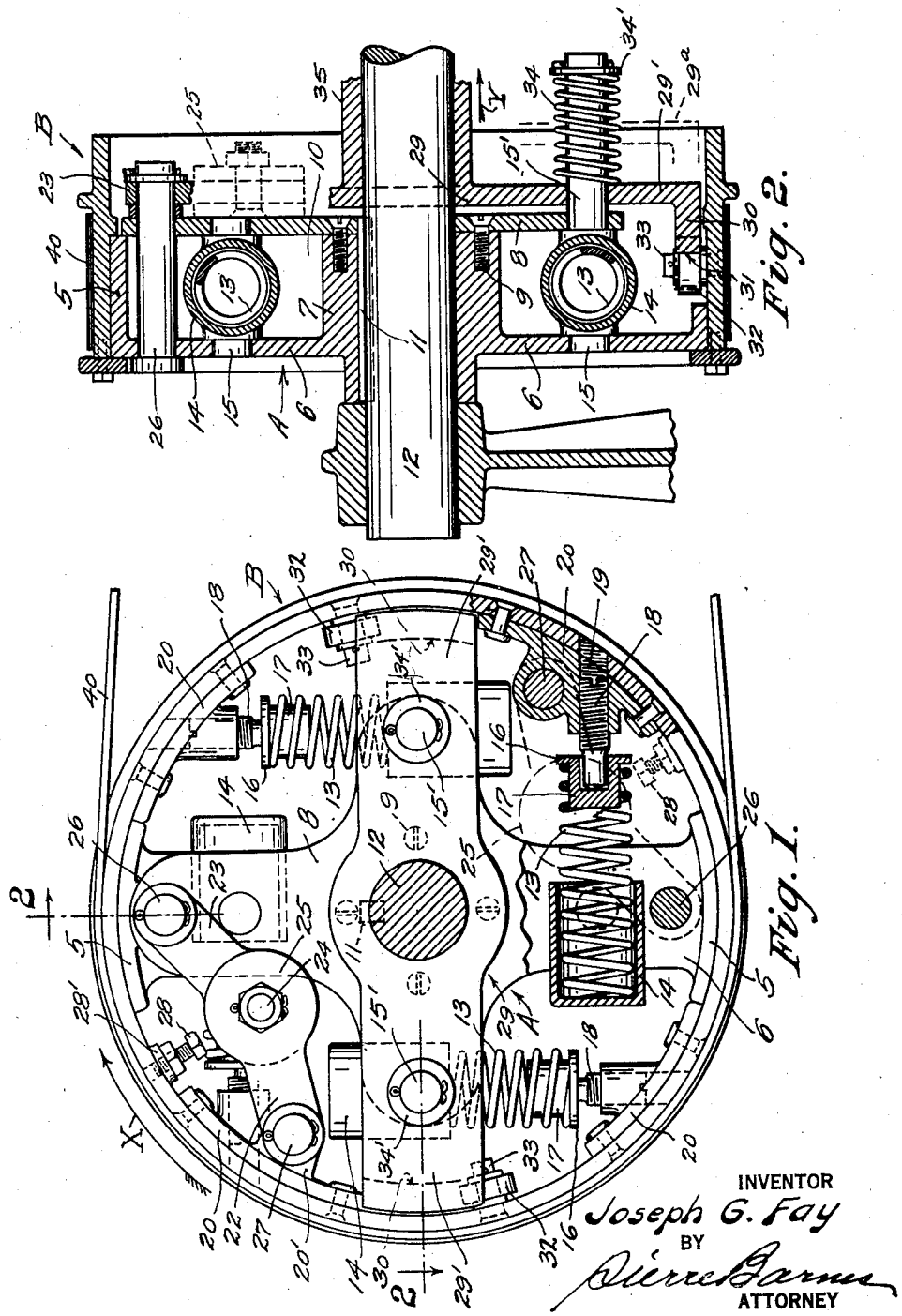
INVENTOR
Joseph G. Fay
BY
ATTORNEY July 24, 1928.

J. G. FAY 1,677,961

GOVERNOR

Filed Dec. 9, 1925   2 Sheets-Sheet 2

INVENTOR
Joseph G. Fay
BY
ATTORNEY

Patented July 24, 1928.

1,677,961

UNITED STATES PATENT OFFICE.

JOSEPH G. FAY, OF SEATTLE, WASHINGTON.

GOVERNOR.

Application filed December 9, 1925. Serial No. 74,254.

This invention relates to a combined speed and torque governor.

The object of the invention, generally stated, is the provision, in power transmission mechanism, of load and speed responsive governing devices which will act to obviate or minimize stresses and strains due to irregularities of speed and load; and to render the mechanism temporarily inoperative to transmit power when subjected to a load in excess of that for which the governing devices are adjusted.

More specific objects and advantages of the invention will appear in the following description.

The invention consists of the novel construction, adaptation and combination of parts hereinafter described and claimed.

Figure 3:
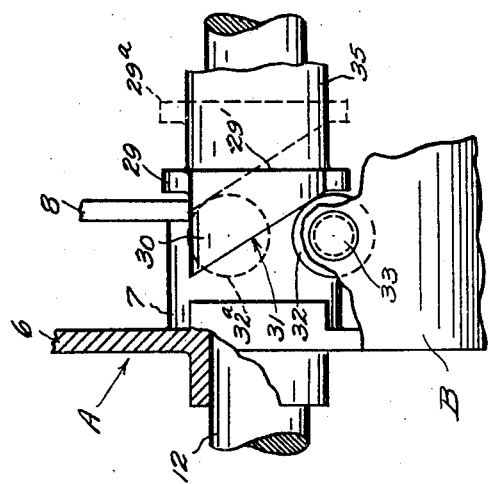
Figure 4:
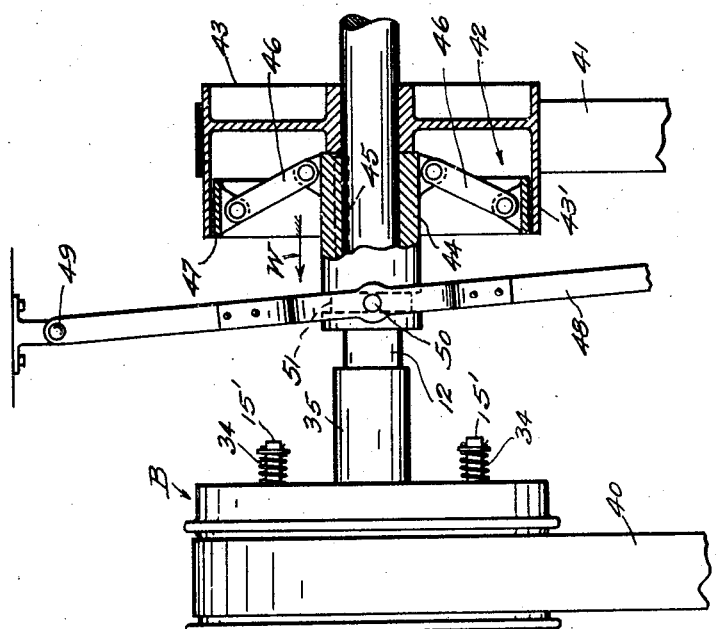

In the accompanying drawings,—
Figure 1 is a view in transverse section of a governor embodying my invention; Fig. 2 is a longitudinal section taken substantially on broken line 2—2 of Fig. 1; and Fig. 3 is a view, partly in elevation and partly in vertical section, illustrating details shown in Figs. 1 and 2. Fig. 4 is a side elevational view of the governor shown applied in power transmission mechanism including a clutch which is shown in longitudinal section.

In carrying out my invention, I provide two cylindrical members A and B disposed one within the other, the outer member B being in the nature of a ring which is bored to receive the peripheral wall elements 5 of the inner member A. Said inner member, as shown in Fig. 2, is provided with a plurality of arm elements 6 which are formed integral with, or rigidly connected to, the respective wall elements 5 and also with a hub 7. 8 represents a spider element which is secured, as by means of screws 9, to said hub and is located in spaced apart relation with the arms 6 to afford a chamber 10 interiorly of the member A. Said inner member is secured by a key 11, or other known means, to a shaft 12 upon which the devise is mounted.

The members A and B are resiliently coupled with each other for relative rotary movements by means of compression springs 13, one end of each spring being seated in a cylindrical box 14 having trunnions 15, 15¹ which are journaled in bearings provided, respectively, in said arms and spider thereby affording oscillatory movement to the respective box 14. The other end of each spring is seated upon the peripheral flange 16 of a ferrule 17 which is mounted upon an end of a spring-adjusting screw 18 taking in a screw threaded hole 19, one for each screw 18, provided in an attachment 20 of the member B.

The springs 13 serve as torque-governing members, through which rotary motion is transmitted from the member B to the member A.

For speed governing purposes I provide at diametrically opposite sides of the shaft 12, pairs of toggle links 22, 23, each pair being joined by a pivot pin 24. The complementary toggle links are provided at their connection with enlarged portions to furnish a heavy body 25.

The outer end of a link 23 is pivotally connected by means of a pin 26 to the arm and spider elements of the member A; whereas the outer end of a link 22 is pivotally connected by a pin 27 with an apertured lug 20¹ of one of the attachments 20 of the member B.

Under normal speed conditions the springs 13, acting through the medium of the two members A and B, will serve to retain the toggles in aproximately the flexed relations in which they are represented in Fig. 1. But when the rotary speed of the device is increased beyond the power of said springs to overcome, the effective centrifugal force acting with respect to the heavy bodies 25 causes the latter to be moved radially outward with respect to the axis of the device until limited by means of stops such, for example, as screws 28 which are adjustably engaged in screw threaded holes of bosses 28¹ of the member B.

The screws 28 are, moreover, regulated to prevent the links of the respective toggles from being moved into alignment or dead centers with respect to each other, thereby enabling the springs 13 to flex the toggles when the rotary speed of the device is diminishing sufficiently to reduce the centrifugal force with respect to the bodies 25.

Mounted upon the shaft 12 for movement axially thereof is a shiftable member comprising a bar 29 having transversely arranged arms 29¹ whose extremities 30 are arranged parallel with said shaft and having inclined cam faces 31 which are disposed in substantially helical relation with respect to the shaft.

Said bar is arranged to rotate in unison with the member A. In the illustrated embodiment, see Figs. 1 and 2, the means for rotatively coupling the bar 29 to the member A is provided by prolonging two of said box trunnions, denoted by 15¹, to extend through apertures provided in the bar arms 29¹, said connection also affording guides permitting axial movement of said shiftable member.

The cam faces 31 of the extremities 30 of said bar arms are engaged by rollers 32 which are journaled upon studs 33 rigid with the member B; said cam faces and rollers being related in a manner so that when the rollers are revolved with the member B in the direction indicated by arrow X in Fig. 1, independently of the rotative movement of the member A and said bar, the rollers taking against the cam faces 31 will impart movement to the bar axially of the shaft 12, as indicated by direction arrow Y in Fig. 2.

Such axial movement of the bar is effected in opposition to springs 34 which are interposed between said bar and washers 34¹ provided on the respective guides 15¹.

For illustrative purposes, the invention is shown in Fig. 4 as employed for regulating the transmission of power from a driving belt 40 to a driven belt 41. To which end, the member B is utilized as a pulley to receive the belt 40, power being transmitted through the medium of springs 13 and member A to the shaft 12 and, from the latter, through the medium of clutch devices 42 to a pulley 43 about which extends the driven belt 41. The pulley 43, constituting one member of the clutch, is mounted upon the shaft 12 for independent rotation. The devices 42 constituting the other member of the clutch, comprises a sleeve 44 splined, as at 45, to the shaft and having link connections 46 with an expansible band 47 which is engageable with the inner peripheral surface of the rim 43¹ of the pulley 43. Said link connections, arranged as shown in Fig. 4, are actuated to expand the band 47 into frictional engagement with the pulley 43 by a movement of the sleeve 44 in the direction indicated by arrow W (Fig. 4), which sleeve movement is accomplished as by means of a manually operated shifting lever 48 which is fulcrumed at 49 to a suitable support and is provided with pins, such as 50, engaging in a circumferential slot 51 of the sleeve 44. The clutch is disengaged by contracting the band 47 through the agency of the links 46 and the sleeve 44 when an endwise movement is imparted to the latter in a direction opposite to that indicated by arrow W, actuated by the sleeve being engaged by the boss element 35 of the bar 29.

When the torque load increases beyond that for which the governor is regulated, the speed of the governor diminishes. As this speed reduction occurs, the centrifugal force lessens with respect to the heavy bodies 25, whereupon the torque load causes the springs 13 to contract and the speed of the driven member A lags with respect to the speed of the driving member B causing the toggle devices 22—23 to flex to accommodate the differential movement between said driving and driven members.

The relatively faster movement of the driving member B thereupon revolubly moves the rollers 32, which are carried by member B, to act against the cam faces 31 of the shiftable member, or bar 29, which is carried by the member A, to force the shiftable member axially of the device into its dotted line position 29ᵃ in Figs. 2 and 3.

This action of the rollers will be understood from Fig. 3 wherein a roller 32 is represented by full lines in its normal position, and by dotted line 32ᵃ in the position it occupies to shift the bar 29 into its dotted line position 29ᵃ due to an excessive torque load.

The bar 29 in being thus thrust out acts through the medium of its hub 35 to impart an endwise movement to the sleeve 44 to effect the disengagement of the clutch as represented in Fig. 4.

The disengaging of the clutch relieves the device of its torque load whereupon the springs 13 effect relative rotative movements of the members A and B with respect to each other. Moreover, when the clutch is disengaged, releasing the governor of its torque load, the speed of the shaft 12 and the members A and B increase with a resultant increase to the centrifugal force with respect to the heavy bodies 25 which thereupon fly outwardly, radially of the shaft 12, extending the spread of the respective toggles 22—23 to act supplementary to the power of the springs 13 in producing the differential movement of the driving and driven members above referred to. Such relative rotative movements of said members are applied to the rollers 32 and bar 29 in a manner to permit the springs 34 to return the bar 29 into its full line position (Fig. 2) with a return of the bar hub 35 into the position in which it is illustrated in Fig. 4—that is to say, away from the clutch sleeve 44.

In the illustrated example, the clutch remains disengaged until the lever 48 is actuated to re-engage the same.

While I have illustrated and described the application for use in disengaging a clutch to relieve the driving member of power transmission mechanism from an overload, I do not wish to be understood as confining myself thereto, inasmuch as my improved governing devices may advantageously be employed otherwise as, for examples, operating electrical, or mechanical, motor shut-off means, and for shifting change-speed gears. As these and other applications of my governing devices form no part of the invention, it is deemed unnecessary to describe and illustrate the same by drawings.

What I claim, is,—

1. A governor comprising a driving member, and a driven member disposed one within the other, springs providing power transmission connections between the members, toggle devices providing yielding connections between said members, said toggle devices including heavy bodies subjected to centrifugal force and cooperating with said springs to impart differential rotary movement to said members responsive to speed reductions of said members, a shiftable member rotatively carried by the driven member, and means carried by the driving member and acting responsive to changes in the relative speeds of the driving and driven members to actuate said means for actuating said shifting member.

2. In a governor, in combination, a driven member, a driving member, toggle devices coupling said members for relative rotary positions, springs cooperating with said toggle devices for regulating the relative rotary positions of said members with respect to each other, heavy bodies carried by the respective toggle-devices and acting centrifugally responsive to a change in the rotary speed of both of said members to effect changes in the relative rotary positions of the members, an axially shiftable member, and means rendered operable by differences in the rotary positions of the driving and driven members with respect to each other for actuating said shiftable member.

3. A governor comprising in combination two rotatable cylindrical members arranged one within the other two sets of devices connecting said members together to compel them to rotate in unison until a predetermined torque load upon the inner member has been exceeded, one of said sets comprising a resilient element and the other set comprising pivoted means arranged to be operatively affected by centrifugal force whereby both sets may yield under pressure of said excessive torque load and permit a limited amount of differential rotation of said members, a shiftable member connected with one of said other members, and means actuated by the differential movement of said other members for operatively affecting said shifting member.

4. In a governor, the combination of a rotatable driving member and a rotatable driven member arranged one within the other and adapted to have a limited amount of independent rotary movement, two sets of devices connecting said members together to compel them to rotate in unison until a predetermined torque load at a predetermined speed upon the driven member has been exceeded, one of said sets comprising a spring and the other a toggle, a shiftable member connected with one of said first named members, and means actuated by the differential rotary movements of said first named members for operatively affecting said shifting member.

Signed at Seattle, Washington, this 4th day of November, 1925.

JOSEPH G. FAY.